United States Patent [19]

Wrigley

[11] Patent Number: 4,884,469
[45] Date of Patent: Dec. 5, 1989

[54] STEERING WHEEL

[75] Inventor: R. Alexander Wrigley, Detroit, Mich.

[73] Assignee: Detroit Marine Engineering Corporation, Detroit, Mich.

[21] Appl. No.: 344,662

[22] Filed: Apr. 28, 1989

[51] Int. Cl.⁴ .............................................. B62D 1/04
[52] U.S. Cl. ...................................... 74/552; 29/159 B; 29/159.3; 428/35.8; 264/274
[58] Field of Search ................ 74/552, 558; 280/750, 280/777, 778, 731; 29/159 B, 159.3; 428/35.8; 264/274, 275

[56] References Cited

U.S. PATENT DOCUMENTS

| | | |
|---|---|---|
| 1,409,175 | 3/1922 | Hecht . |
| 1,509,883 | 9/1924 | Stanwood . |
| 1,740,750 | 12/1929 | Smith . |
| 1,760,560 | 5/1930 | Kranz et al. . |
| 1,869,332 | 7/1932 | Bronson et al. . |
| 1,869,333 | 7/1932 | Bronson et al. . |
| 1,869,334 | 7/1932 | Bronson et al. . |
| 1,869,816 | 8/1932 | Kraft ........................ 29/159 B X |
| 1,876,693 | 9/1932 | Kraft ........................ 29/159 B X |
| 1,905,926 | 4/1933 | Marbach et al. . |
| 1,915,769 | 6/1933 | Thomas ..................... 29/159 B X |
| 1,931,162 | 10/1933 | Kranz et al. . |
| 1,931,163 | 10/1933 | Kranz et al. . |
| 2,196,731 | 4/1940 | Husted . |
| 2,827,801 | 3/1958 | Ingola . |
| 3,398,601 | 8/1968 | Schroeder . |
| 3,583,255 | 6/1971 | Curcuru . |
| 4,118,455 | 10/1978 | Byrn . |
| 4,295,256 | 10/1981 | Pascal ........................ 264/274 X |
| 4,313,249 | 2/1982 | Douthwaite ................... 29/159 B |
| 4,598,002 | 7/1986 | Kimura ........................ 74/552 X |
| 4,635,500 | 1/1987 | Overcashier et al. ......... 29/159 B X |

FOREIGN PATENT DOCUMENTS

| | | |
|---|---|---|
| 1159287 | 12/1963 | Fed. Rep. of Germany ........ 74/552 |
| 2600134 | 12/1987 | France ........................... 280/750 |
| 0160666 | 9/1984 | Japan ............................. 280/750 |
| 0060373 | 3/1986 | Japan ............................. 29/159 B |
| 0181772 | 8/1986 | Japan ............................. 280/750 |
| 0241262 | 10/1986 | Japan ............................. 280/750 |
| 0077281 | 4/1987 | Japan ............................. 74/552 |
| 0214052 | 9/1987 | Japan ............................. 74/552 |
| 294034 | 7/1928 | United Kingdom ............... 74/552 |

Primary Examiner—Vinh Luong
Attorney, Agent, or Firm—Barnes, Kisselle, Raisch, Choate, Whittemore & Hulbert

[57] ABSTRACT

A steering wheel comprising a one-piece plastic body including a hub portion, an annular rim portion and a plurality of spokes extending from the hub portion to the rim portion. A sheet metal insert is molded in situ in the hub portion to define the opening for a steering shaft. The metal insert includes a central generally circular portion and ends which abut one another and extend radially outwardly in the hub. Aligned openings in the circular portion and hub portion are adapted to receive a locking pin for locking the wheel to the steering shaft.

4 Claims, 2 Drawing Sheets

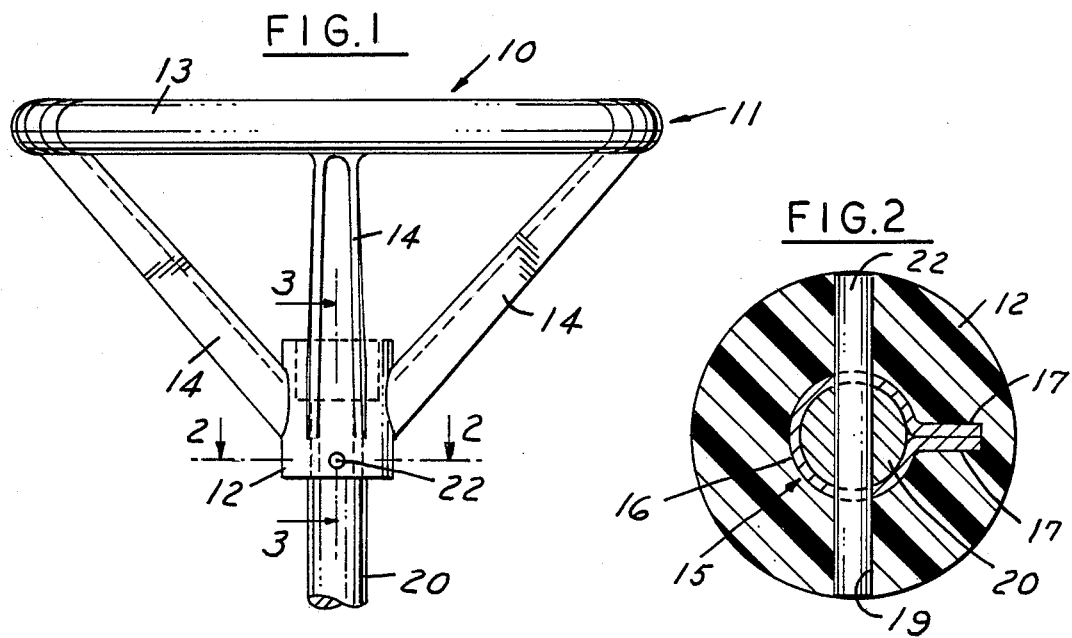
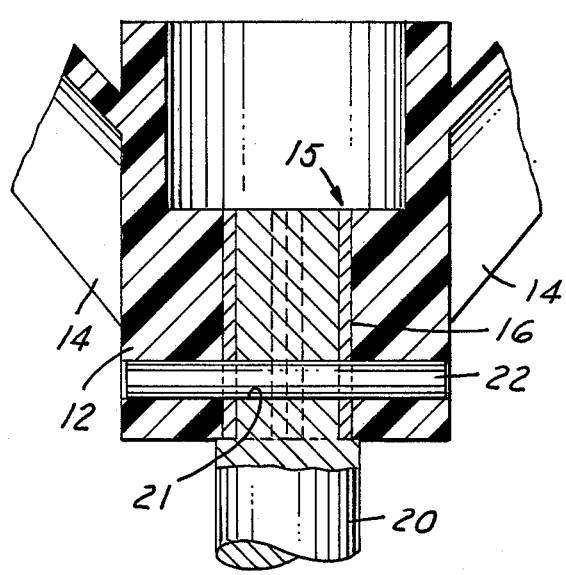
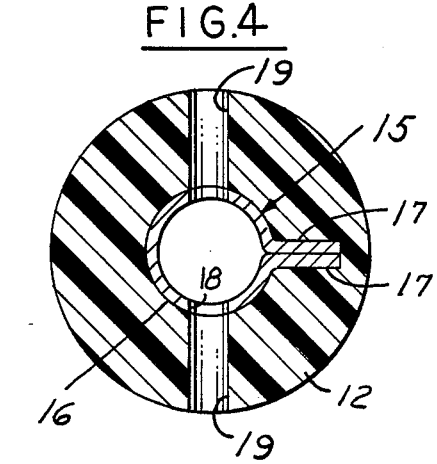
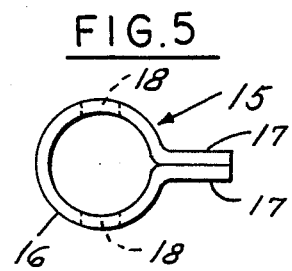
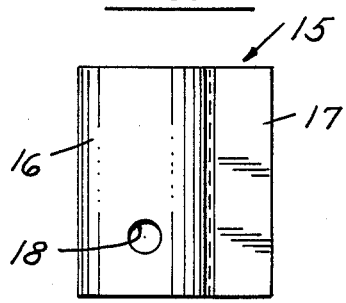

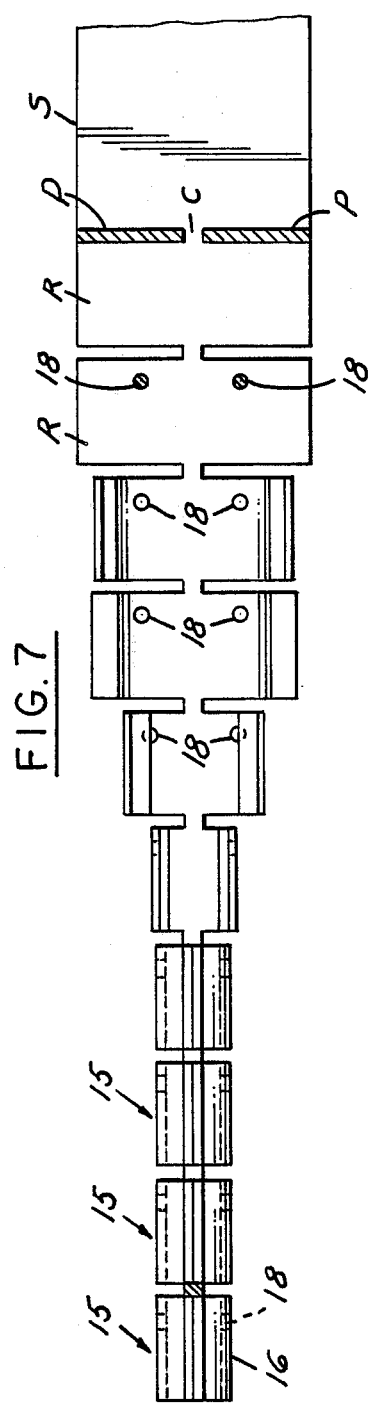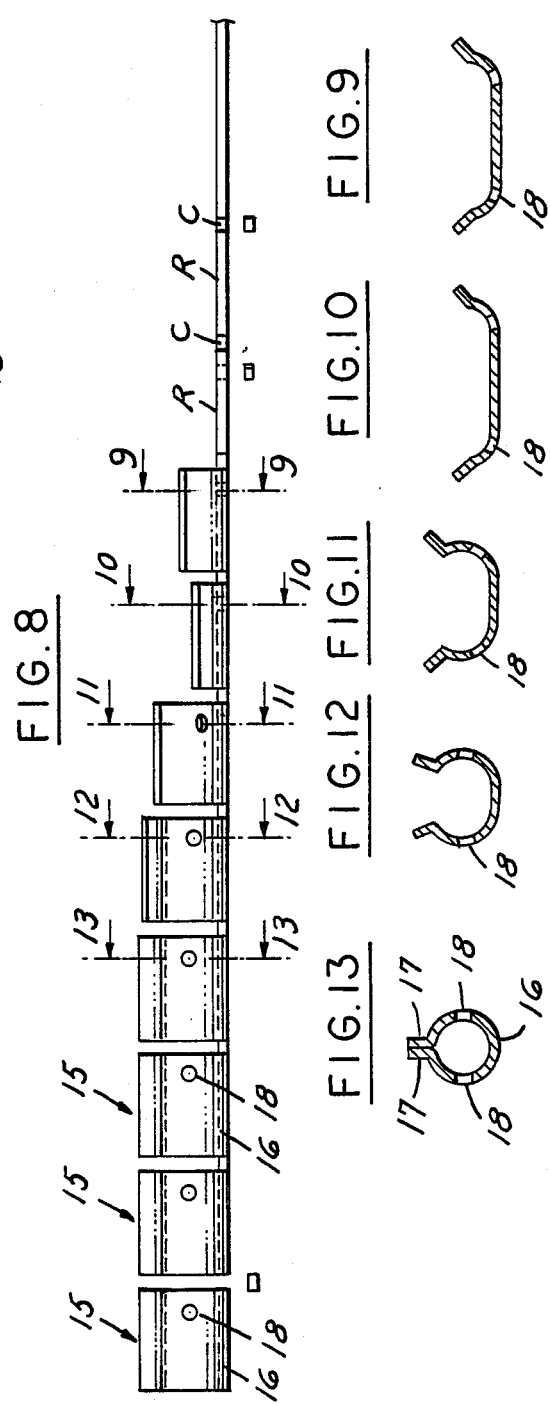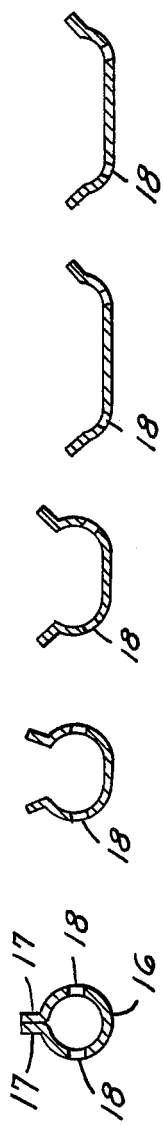

STEERING WHEEL

This invention relates to steering wheels and particularly to steering wheels of the light weight type normally used in marine applications or light tractor applications.

BACKGROUND AND SUMMARY OF THE INVENTION

In light weight steering wheels for marine applications or tractor applications, it is common to mold a steering wheel comprising a hub, an annular rim and spokes extending between the hub and the rim, in one piece about a die cast insert or a machined steel cylindrical insert which has an opening for receiving the steering shaft. Such a construction has been used extensively and functions satisfactorily. However, such inserts are costly and adds weight to the wheel.

Among the objectives of the present invention are to provide a steering wheel which is lower in cost and lighter in weight.

In accordance with the invention, the steering wheel comprises a one-piece plastic body including a hub portion, an annular rim portion and a plurality of spokes extending from the hub portion to the rim portion. A sheet metal insert is molded in situ in the hub portion to define the opening for a steering shaft. The metal insert includes a central generally circular portion and ends which abut one another and extend radially outwardly of the hub. In one form, aligned openings in the circular portion and hub portion are adapted to receive a locking pin for locking the wheel to the steering shaft.

BRIEF DESCRIPTION OF THE DRAWINGS

FIG. 1 is a fragmentary elevational view of a steering wheel embodying the invention mounted on a steering shaft;

FIG. 2 is a sectional view on an enlarged scale taken along the line 2—2 in FIG. 1;

FIG. 3 is a fragmentary sectional view on an enlarged scale taken along the line 3—3 in FIG. 1;

FIG. 4 is a sectional view similar to FIG. 2 without the shaft being in place;

FIG. 5 is a plan view of the insert utilized in the steering wheel;

FIG. 6 is an elevational view of the insert;

FIG. 7 is a plan view showing the successive forming of the inserts;

FIG. 8 is an elevational view showing the successive forming of the inserts;

FIG. 9 is a sectional view taken along the line 9—9 in FIG. 8;

FIG. 10 is a sectional view taken along the line 10—10 in FIG. 8;

FIG. 11 is a sectional view taken along the line 11—11 in FIG. 8;

FIG. 12 is a sectional view taken along the line 12—12 in FIG. 8;

FIG. 13 is a sectional view taken along the line 13—13 in FIG. 8.

DESCRIPTION

Referring to FIGS. 1-6, the steering wheel 10 embodying the invention comprises a one-piece plastic body 11 that includes a hub 12, an annular rim 13 and a plurality of spokes 14 extending from the hub 12 to the rim 13. The wheel 10 is molded in situ about a sheet metal insert 15 in the hub 12. The insert 15 is made of a rectangular piece of flat sheet metal formed with a central generally cylindrical portion 16 and flattened ends 17 that extend radially outwardly and are in abutting but non-welded relationship to one another. The ends extend radially and have a radial length less than the thickness of the hub 12. The insert has aligned openings 18. When the insert 15 is positioned in a mold for molding the wheel about the insert, it is supported such that the plastic is molded about the insert 15 (FIG. 4). Simultaneously during the injection molding process aligned openings 19 are formed in the hub 12 in aligned relationship with the openings 18 and the insert 15 by mold inserts, in accordance with well known molding practice. When the wheel is applied to a steering shaft 20 having a transverse opening 21, the openings 18, 19 are aligned with the opening 21 and a locking pin 22 is inserted to hold the wheel on the steering shaft 20.

The inserts 15 are preferably formed by successive formation from an elongated flat metal strip S (FIGS. 7, 8) by first punching portions P from the strip so that a plurality of rectangular pieces R are formed connected by a small connecting portion C. The openings 18 are then punched from the strip in a successive step and then each rectangular portion R is progressively bent to form the circular portion 16 and flattened and abutting end portion 17 in successive steps moving from left to right as shown in FIGS. 7 and 8 and in the sectional views FIGS. 9-13. Finally, a punch Q acting on connecting portion severs each formed insert 15.

The plastic of the wheel may comprise polypropylene polymers or ABS.

In can thus be seen that there has been provided a steering wheel that utilizes a low cost insert that can be readily made and effectively provide a reinforced hub for the steering wheel.

I claim:

1. A steering wheel comprising
   one-piece plastic body including a hub portion,
   an annular rim portion and a plurality of spokes extending from the hub portion to the rim portion,
   a sheet metal insert molded in situ in the hub portion to define an opening for a steering shaft,
   said metal insert including a central generally circular portion and flattened free ends which abut one another and extend radially outwardly of the hub portion and are embedded in said hub portion.

2. The steering wheel set forth in claim 1 including aligned openings in the circular portion and hub portion adapted to receive a locking pin for locking the wheel to the steering shaft.

3. The steering wheel set forth in claim 2 wherein said circular portion of said insert has aligned openings therein, said hub portion having aligned openings therein molded in situ and aligned with the openings in said insert.

4. The steering wheel set forth in claim 1 wherein said flattened free ends of said insert have their free ends spaced radially from an outer periphery of the hub portion.

* * * * *